(12) United States Patent
Harris

(10) Patent No.: US 11,657,716 B1
(45) Date of Patent: May 23, 2023

(54) AUTOMOBILE SYSTEM FOR DETERMINATION AND PROTECTION AGAINST EXTERNAL CRASH HAZARDS

(71) Applicant: Scott C Harris, San Diego, CA (US)

(72) Inventor: Scott C Harris, San Diego, CA (US)

( * ) Notice: Subject to any disclaimer, the term of this patent is extended or adjusted under 35 U.S.C. 154(b) by 0 days.

(21) Appl. No.: 17/654,584

(22) Filed: Mar. 12, 2022

Related U.S. Application Data

(60) Provisional application No. 63/268,469, filed on Feb. 24, 2022.

(51) Int. Cl.
*G08G 1/16* (2006.01)

(52) U.S. Cl.
CPC .................... *G08G 1/162* (2013.01)

(58) Field of Classification Search
None
See application file for complete search history.

(56) References Cited

U.S. PATENT DOCUMENTS

| | | | | |
|---|---|---|---|---|
| 6,580,374 | B2 * | 6/2003 | Schrage | G08G 1/095 340/905 |
| 6,831,572 | B2 * | 12/2004 | Strumolo | B60Q 9/008 340/904 |
| 7,151,468 | B2 * | 12/2006 | Cummings | G08G 1/052 340/936 |
| 7,488,021 | B1 * | 2/2009 | Roos | B60P 3/40 296/26.11 |
| 9,643,534 | B1 * | 5/2017 | Zharichenko | B60Q 1/444 |
| 2002/0101360 | A1 * | 8/2002 | Schrage | G08G 1/0962 340/901 |
| 2003/0198509 | A1 * | 10/2003 | Barth | F16B 7/185 403/180 |
| 2004/0232684 | A1 * | 11/2004 | Curl | B60N 2/24 280/756 |
| 2017/0101093 | A1 * | 4/2017 | Barfield, Jr. | G08G 1/09675 |
| 2019/0118888 | A1 * | 4/2019 | Braunberger | B60Q 1/442 |
| 2020/0010077 | A1 * | 1/2020 | Cormack | B60W 50/087 |
| 2020/0332484 | A1 * | 10/2020 | Roy | E01F 9/662 |

* cited by examiner

*Primary Examiner* — Muhammad Adnan

(57) ABSTRACT

A smart car system that determines when danger from another vehicle is likely, and addresses that danger. An embodiment signals the other car using open air communication. Another embodiment starts the deployment of anti-crash structure, e.g, airbag or an anti crash fencing.

15 Claims, 3 Drawing Sheets

AUTOMOBILE SYSTEM FOR DETERMINATION AND PROTECTION AGAINST EXTERNAL CRASH HAZARDS

This application claims priority from provisional application No. 63/268,469, filed Feb. 24, 2022, the entire contents of which are herewith incorporated by reference.

BACKGROUND

Modern vehicles, referred to herein as "smart cars", have cameras, sensors, and computers, that can detect and sometimes protect against, collisions and other dangers. Such smart cars can use their processing capability to determine danger, for example such as another car or an obstacle, and automatically brake to protect the vehicle occupants. This is typically based on the sensors and the smart car, such as cameras, detecting such an obstacle.

It is postulated that there have been suggestions for smart cars to communicate this kind of information to another smart car. For example, it is postulated that smart car number one which is ahead of smart car number 2 may send a message to smart car number 2 saying I am stopping, you need to stop also. The undersigned knows of no such specific prior art showing this, however, the undersigned postulates that such has been suggested by those of ordinary skill in the art.

SUMMARY

What if, however, you, in your smart car, send messages to another smart car, that for whatever reason does not answer such a communication. For example, what if the "bad" smart car isn't talking. Or what if the other car, is not a smart car at all.

The present application describes things that a smart car can do to protect about against dangerous situations beyond communicating with other smart cars. This may be the case when the other smart cars do not answer the communication, or that the other car that is acting badly is not "smart"

BRIEF DESCRIPTION OF THE DRAWINGS

These and other aspects will now be described with reference to the accompanying drawings wherein.

The Drawings show aspects of the invention, and specifically.

DETAILED DESCRIPTION

It is postulated that "smart cars" will be able to communicate with one another. The communication between cars could be over any wireless channel, such as Wi-Fi, wifi direct, cellular, Bluetooth, another RF communication or other. The present application addresses the issue of, and considers the issue of, what if the other car, the "bad car" is not responding to a communication.

If the bad car is not acting properly, this invention describes how the "good car" can still use its intelligence in an attempt to prevent a crash, or to take an action to prepare for a crash.

For purposes of this patent application, we will refer to the automobile in which this device is installed as the "good car". In an embodiment, the good car can be moving, or stopped. Some other car, the "bad car", is taking an action which the good car recognizes as dangerous. For example, the good car can be stopped at a light, and the bad car coming towards the light at an excessive speed, showing no signs of slowing down. The bad car is acting like it's not going to stop at the light, and it's going to hit you at full speed. You're stopped; what can the machine intelligence in your car do?

Figure 1:
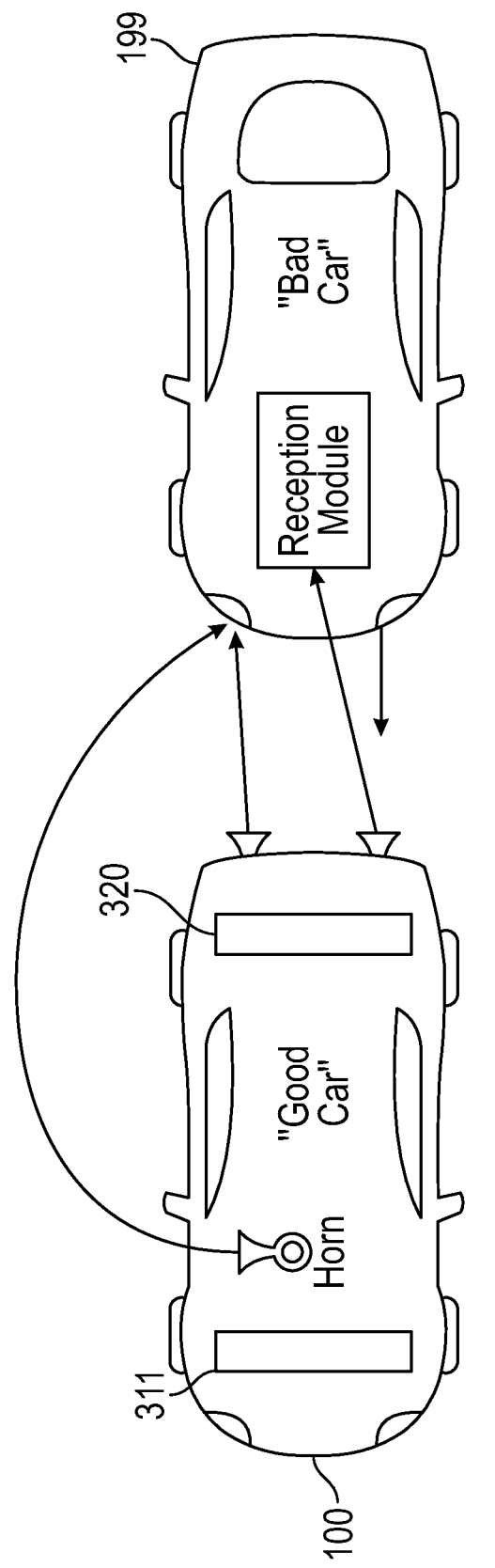
FIG. 1 shows a transmission operation between multiple vehicles.
Figure 2:
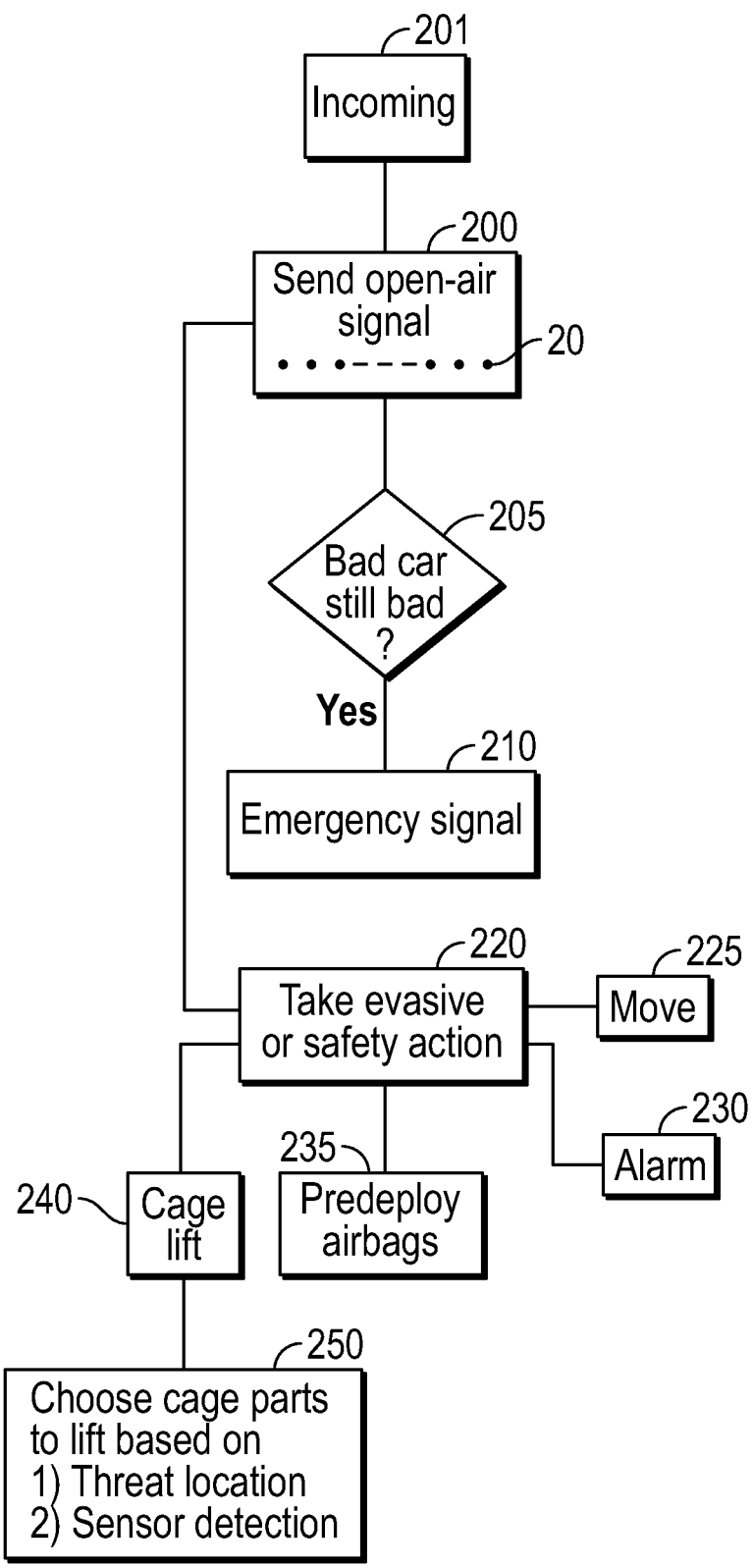
FIG. 2 shows a flowchart of operation among the vehicles.

FIG. 1 shows an embodiment where the good vehicle, e.g., car 100 is being threatened by the bad car 199. FIG. 2 shows a flowchart executed by a processor in a vehicle, e.g., the good car.

At 201, the good car detects an incoming hazard.

At 200, the good car 100 sends a wireless signal to the bad car 199 at 200, saying "slow down, you are going to crash into me". In one embodiment, the wireless signal can be set using a modulated format.

205 determines that the bad car is still being bad, that is still doing something that the good car considers to be dangerous. For purposes of this embodiment, the bad car 199 is not stopping its bad action, or is perhaps taking some action to stop, but that action is judged by the intelligence in the good car to be insufficient to avoid a dangerous situation.

One possible reason is a communication problem. The communication system in the bad car could be malfunctioning, or hacked, or just not receiving the information.

If 205 determines that the bad car is still being bad, then at 210, the system sends an emergency signal to the bad car 199 using open air communication, as described herein.

In order to receive this kind of emergency contact, the bad car 199 has a reception module 198. This can be installed in the car, or can be retrofitted into up a car. Alternately, because the communication is via open air communication, this can be received by any kind of device in the car. In one embodiment, a cellular phone in the vehicle runs an app that is always monitoring for beacons of the specified format, for example monitoring for light modulations and/or monitoring for sound modulations of this type.

The reception module 198 receives communication directly over the open air, from other cars. In embodiments, the module can receive modulated light signals from the headlights or tail lights of the other vehicle. In another embodiment, the module receives sound signals, e.g. modulated sound from the horn of the other vehicle. Any open air device can be modulated and used as that communication system.

At 210, the good car sends an emergency signal using the open air transmitter. The emergency signal can be sent as a modulated signal using the rear lights 105, the front lights 110, the horn 115, or any other signalling capability on the car that can be received over the open air by a receiver.

The emergency beacon can be any on-and-off combination that can be recognized by any other device but in in an embodiment, the emergency beacon can be for example a Morse code beacon here S-O-S in Morse code (••• --- •••) shown as 206. The Morse code SOS can be sent via front or rear lights, horn, overhead dome light, or any other structure in the car.

Other modulation forms can be used.

The code can also be sent in a digital format using the analog lights to go on and off to modulate the digital operation.

A reception module 198 that is intended to receive these emergency signals. If the reception module 198 receives the emergency signal, it may respond by immediately interrupting the driver's control of the bad car 199, or by signalling the driver or by some other means.

At the same time as the emergency signal, or at a time after the emergency signal, the good car can try, at 220, to take some kind of evasive action to avoid getting hit by the bad car. The evasive action can be for example moving at 225, for example move forward, backwards, or sideways. This will not always be possible, although sometimes it may be preferable to move in some direction.

The evasive action can also include an audible alarm at 230 to the user of the vehicle, which can include sounding the alarm or horn. The alarm can be a conventional audible alarm, and can also include some kind of announcement to the driver that there is a danger of being hit from behind, or the like.

At 235, a pre-airbag deployment can be started. For example, airbags are for emergencies, but it may be possible to pre stress or bias the airbag in a way so that it can start operating more quickly, when it when the system concludes that a crash is likely. The air bag pre deployment may take any particular form, for example anything that starts the airbag action into place. When an airbag is under the steering wheel, the airbag action can be include un-clicking the steering wheel cover.

Airbags conventionally fire using an explosive charge, so that the airbag can respond immediately. One of the reasons why people are often injured by airbags because of that explosive charge. The pre-deployment may allow a version of the airbag which does not use an explosive charge or uses a less intense explosive charge, In this embodiment, therefore, there may be two separate airbag deployment features, one emergency one that uses the explosive charge, and one less intense one that is used after a part of the airbag has been pre-deployed.

This can alternatively include, as described herein, starting to raise an automatic cage, or putting up a rollbar.

Figure 3:
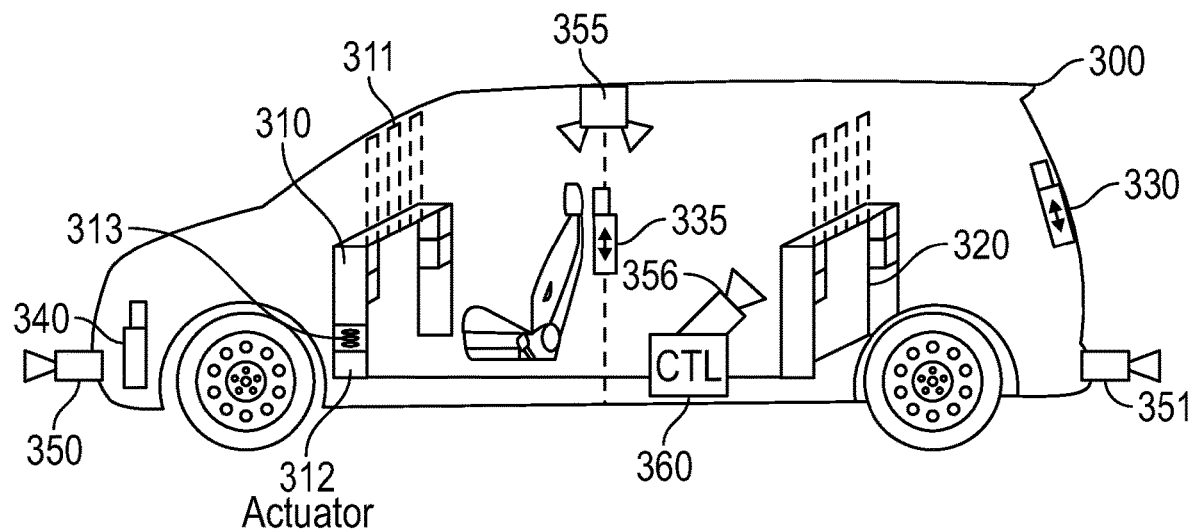
FIG. 3 shows a block diagram of different systems in the vehicles.

An automated cage lift can be started at 240. FIG. 3 shows an embodiment where the vehicle 300 includes a number of different deployable cages and supports. There may be a front cage 310 which is normally in a lowered position, below the level where it will interfere with anything. The cage can be outside the passenger compartment or inside the passenger compartment. The cage can be lowered to the position shown in 310 and raised to the position shown in 311. In order to raise the cage, there is an actuator 312 which is energized to cause the cage to rise. There can also be a spring device 313 which can store energy in the spring device causing the cage to rise faster in an emergency. An explosive charge can also be used to raise the cage more quickly. The cage can lock into an upward position in an embodiment, and require a specific actuation for lowering the cage. In another embodiment, the cage can be locked in position, and the pre-deployment carried out to unlock the cage to allow it to begin moving more quickly.

In addition to the front cage 310 there can also be a rear cage 320.

In addition to the cages, there can be structural supports that are extended, in areas where the vehicle is most likely to be vulnerable to damage from an incoming vehicle. An embodiment includes a support 330 in the rear, support 335 on the side, and a structural support 340 in the front. These supports can be structural supports which are normally retracted, but which can be extended in order to provide additional support to the structure of the vehicle. The supports are selected depending on the location of the likely collision. If there is a likely collision from the rear for example the support 340 and the cage 320 may be raised.

The cage can be wired or otherwise communicated with by a controller 360 in the vehicle.

Smart cars often have cameras and sensors therein. In an embodiment, the external cameras 350 and 351 can be used to detect the bad car coming. In addition, however, an internal camera 355, 356 can be used to detect the position of drivers and passengers. The cameras can determine if drivers or passengers are in a location where extending the cage or the support could harm the passengers. If not, the supports and/or cages can be raised more quickly, for example using a spring or explosive charge.

Figure 4:
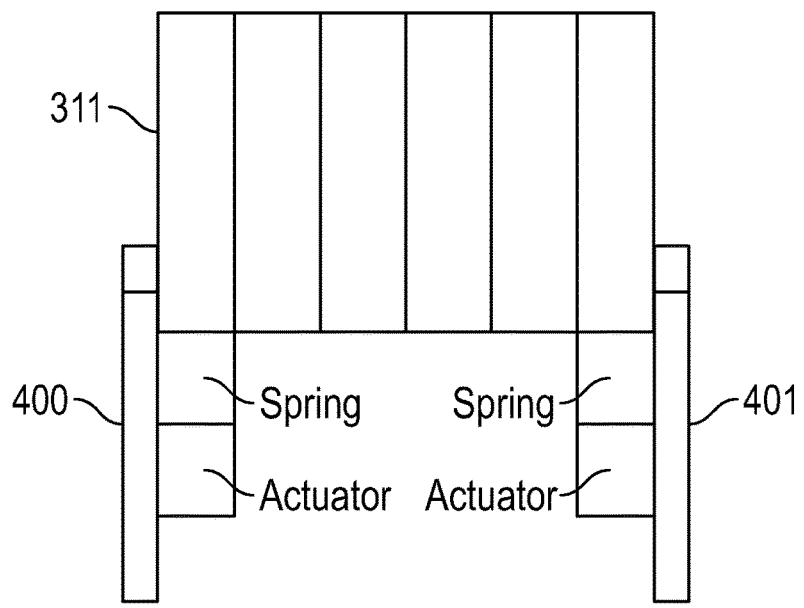
FIG. 4 shows an actuator system in the vehicles.

These cages can be left in the downward most position in a position and configuration where they are completely out of the way, and ready to pop into an upward position in order to protect the driver against a front or rear possibility of collision. The cages can be as shown in FIG. 4, which can be a basic safety cage 311, which can be lifted and lowered, using springs, and actuator, or an explosive charge on both sides of the track sides 400, 401 which hold the cage. The speed at which the cage is deployed may be controlled based on how quickly the accident is likely to occur, the location of the people in the vehicles, and whether a pre-deployment has occurred.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system, comprising:
   a vehicle, including a computer, and at least one sensor that senses conditions around the vehicle, the computer operating to determine a hazardous condition,
   the vehicle including a safety system, that is deployed to enhance safety for a passenger of the vehicle during a crash,
   wherein the computer operates to begin deploying the safety system upon determining the hazardous condition,
   wherein the safety system includes a movable cage, and the computer operates to begin deploying the movable cage by beginning to move the movable cage, the system further comprising at least one camera in the vehicle;
   wherein the safety system uses the at least one camera to determine if people in the vehicle are in location interfering with moving the cage, and determines how aggressively to move the cage based on the location of the people in the vehicle.

2. The system as in claim 1, wherein the wireless signal is sent by modulating lights of the vehicle.

3. The system as in claim 1, wherein the wireless signal is sent by modulating a sound producing part on the vehicle.

4. The system as in claim 3, wherein the sound producing part is a horn of the vehicle, that is modulated to send the wireless signal.

5. The system as in claim 1, wherein the hazardous condition is another vehicle operating in a hazardous way.

6. The system as in claim 5, wherein the vehicle operating in the hazardous way to send a wireless signal using systems in the vehicle, to send a wireless signal to another vehicle.

7. The system as in claim 6, wherein the safety system includes an airbag, and the airbag is pre-deployed by beginning opening operations of the airbag upon sensing the hazardous condition.

8. The system as in claim 6, further comprising a reception module, which receives the wireless signal.

9. A system, comprising:
a vehicle, including a computer, and at least one sensor that senses conditions around the vehicle, the computer operating to determine a hazardous driving condition,
the vehicle including a safety system, that is deployed to enhance safety for a passenger of the vehicle during a crash,
and the computer operates to begin deploying the safety system upon determining the hazardous condition,
wherein the safety system includes a movable cage, and the movable cage is pre-deployed by beginning to move the cage upon determining the hazardous condition,
wherein the safety system uses cameras in the vehicle to determine if people in the vehicle are in a location interfering with moving the cage, and determines how aggressively to move the cage based on the location of the people in the vehicle.

10. The system as in claim 9, wherein the safety system also includes an airbag, and the airbag is pre-deployed by beginning opening operations of the airbag upon sensing the hazardous condition.

11. The system as in claim 9, wherein the hazardous condition comprises actions by another vehicle.

12. The system as in claim 9, wherein the vehicle operates to send a wireless signal using systems in the vehicle to the another vehicle.

13. The system as in claim 12, wherein the wireless signal is sent by modulating lights of the vehicle.

14. The system as in claim 12, wherein the wireless signal is sent by modulating a sound producing part on the vehicle.

15. The system as in claim 12, wherein the wireless signal is sent by modulating a horn of the vehicle.

* * * * *